US006255031B1

(12) United States Patent
Yao et al.

(10) Patent No.: US 6,255,031 B1
(45) Date of Patent: Jul. 3, 2001

(54) NEAR INFRARED ABSORBING FILM, AND MULTI-LAYERED PANEL COMPRISING THE FILM

(75) Inventors: Kenji Yao; Masahiro Koike, both of Osaka; Yasuko Suzuki, Hirakata; Kazuo Sakurai, Himeji; Takashi Indo; Kouei Igarashi, both of Osaka, all of (JP)

(73) Assignee: Kanebo, Ltd., Tokyo (JP)

( * ) Notice: Subject to any disclaimer, the term of this patent is extended or adjusted under 35 U.S.C. 154(b) by 0 days.

(21) Appl. No.: 09/171,392

(22) PCT Filed: Apr. 16, 1997

(86) PCT No.: PCT/JP97/01341

§ 371 Date: Mar. 10, 1999

§ 102(e) Date: Mar. 10, 1999

(87) PCT Pub. No.: WO97/38855

PCT Pub. Date: Oct. 23, 1997

(30) Foreign Application Priority Data

| | | |
|---|---|---|
| Apr. 18, 1996 | (JP) | 8-122705 |
| Sep. 9, 1996 | (JP) | 8-261354 |
| Sep. 9, 1996 | (JP) | 8-261355 |
| Sep. 9, 1996 | (JP) | 8-261356 |
| Feb. 6, 1997 | (JP) | 9-039788 |

(51) Int. Cl.[7] .......... G03C 1/76
(52) U.S. Cl. .......... 430/270.1; 430/273.1
(58) Field of Search .......... 430/271.1, 273.1, 430/281.1, 270.1

(56) References Cited

U.S. PATENT DOCUMENTS

| | | | | |
|---|---|---|---|---|
| 5,530,086 | * | 6/1996 | Fuji et al. | 528/193 |
| 5,856,060 | * | 1/1999 | Kawamura et al. | 430/201 |

FOREIGN PATENT DOCUMENTS

| | | | |
|---|---|---|---|
| 6-214113 | * | 8/1994 | (JP) . |
| 6-256541 | * | 9/1994 | (JP) . |
| 7-178861 | * | 7/1995 | (JP) . |
| 6-317755 | * | 11/1996 | (JP) . |
| 6-355880 | * | 12/1996 | (JP) . |
| 7-236103 | * | 9/1997 | (JP) . |
| 7-297697 | * | 10/1997 | (JP) . |
| 8-26965 | * | 2/1998 | (JP) . |
| 8-28249 | * | 2/1998 | (JP) . |

* cited by examiner

*Primary Examiner*—Hoa Van Le
*Assistant Examiner*—Barbara Gilmore
(74) *Attorney, Agent, or Firm*—Hogan & Hartson, LLP

(57) ABSTRACT

In a film or panel having excellent near-infrared absorbability and excellent near-infrared shieldability, and having a high degree of visible ray transmittance and good color tone, in order to produce the near-infrared-absorbing film or panel having good color tone while the near-infrared-absorbing dye disposed therein is kept stable, the dye and the binder resin for the dye are specifically selected, and the production method is also specifically selected. In addition, for the purpose of producing the film or panel while the dye disposed therein is kept stable and for the purpose of making the film or panel have additional functions such as electromagnetic radiation absorbability, the film or panel is made to have a multi-layered structure.

14 Claims, 8 Drawing Sheets

NEAR INFRARED ABSORBING FILM, AND MULTI-LAYERED PANEL COMPRISING THE FILM

FIELD OF THE INVENTION

The present invention relates to an infrared absorbing film, which absorbs near-infrared rays emitted by image output devices such as plasma displays, lighting appliances or the like so as to prevent the penetration of the rays through the film, thereby preventing malfunction of remote-control infrared communication ports which use rays falling within an infrared range for communication and even preventing malfunction of appliances to be controlled by those remote-control devices. More precisely, the invention relates to a multi-layered film or a panel of a multi-layered sheet that includes an absorbing layer which exhibits a near-infrared absorbing effect and an electromagnetic radiation shielding effect and which is combined with a transparent conductor. The present invention further relates to a near-infrared cut-off filter to be used, for example, for light-receiving sensitivity correction or color tone correction in photodiodes or solid image sensor (CCD) cameras used in light-receiving devices or image pickup devices in optical appliances, and also to a film or panel to be used for detecting forged cash cards and ID cards. The multi-layered sheet referred to herein is prepared by laminating functional films, including the film according to the present invention, on a substrate which has a shape-retaining function and is transparent.

DESCRIPTION OF RELATED ART

Conventional near-infrared-absorbing panels include glass filters having a metal deposit film formed thereon, and metal ion-containing phosphate glass filters. However, because of the phenomenon of interference, the glass filters having the metal deposit film are problematic in that they are negatively influenced by reflected light and their infrared-absorbing capabilities often do not correspond to luminous quantities. In addition, the manufacturing costs of such glass filters containing the metal deposit film are high. On the other hand, the metal ion-containing phosphate glass filters are also problematic in that the filters absorb moisture and they require a complicated manufacturing process. Moreover, the conventional glass filters are further problematic in that they are heavy and are easily cracked, and they are difficult to handle.

In order to solve these problems, various plastic materials having absorption characteristics within the infrared range have been proposed for producing plastic filters. For example, as described in Japanese Patent Application Laid-Open (JP-A) Hei-6-214113, panels are produced by dissolving a metal phthalocyanine compound in a monomer of methyl methacrylate followed by polymerizing the monomer. Also known are near-infrared-absorbing panels which are produced by kneading a phthalocyanine compound or an anthraquinone or cyanine compound in a resin melt followed by sheeting the resulting mixture through extrusion.

However, the panel production includes the steps of high-temperature melt extrusion and polymerization, and therefore can not be used with near-infrared-absorbing materials which are thermally unstable or with materials which are decomposed or deteriorated through chemical reaction. Accordingly, the near-infrared-absorbing characteristics of conventional panels produced are not satisfactory.

In addition, when panels are used in displays, etc., the near-infrared-absorbing characteristics and the color tone characteristics of the panels are important. To control the color tone of panels, in general, a plurality of different dyes must be mixed. However, when mixed with other dyes, some dyes having near-infrared-absorbing characteristics may change their characteristics, or may even change their near-infrared-absorbing capabilities through chemical reaction or dielectric interaction with the dyes mixed therewith.

BRIEF DESCRIPTION OF THE INVENTION

To overcome the drawbacks and problems of the prior art described above, the preferred embodiments of the present invention provide a multi-layered, near-infrared-absorbing film or panel, which includes an absorbing layer of a near-infrared-absorbing dye dispersed in a transparent polymer material. In addition, a near-infrared-absorbing panel of such a multi-layered film or sheet according to preferred embodiments of the present invention which solves the problem with conventional devices described above is produced by a specific method of casting or coating a uniform mixture including a near-infrared-absorbing dye and a polymer resin. In this method, the dye and the polymer resin material may be selectively combined. Accordingly, the preferred embodiments of the present invention provide a film having a high near-infrared absorbance and a high visible-ray transmittance, and also a panel of a multi-layered sheet including such a novel film.

Another preferred embodiment of the present invention provides a near-infrared-absorbing, single-layered or multi-layered film which includes an absorbing layer of a near-infrared-absorbing dye dispersed in a transparent polymer resin, and also a multi-layered sheet panel including such a novel film. When mixed with different dyes, some dyes change their characteristics, or some others chemically react with them or dielectrically interact with them, or still some others lose their thermal stability. Therefore, in preferred embodiments of the present invention, individual dyes are separately sheeted into different films using suitable methods, depending on their characteristics, and a plurality of the resulting films are laminated to define a multi-layered film or sheet in such a manner that the multi-layered film or sheet exhibits desired color tones in the near-infrared-absorbing range and the visible-ray range.

DETAILED DESCRIPTION OF PREFERRED EMBODIMENTS

Figure 1A:
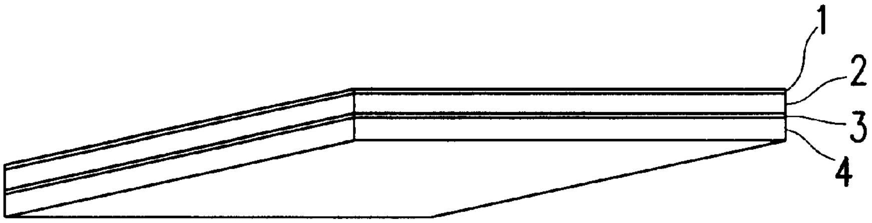
FIGS. 1-A, 1-B and 1-C show preferred embodiments of the structure of the near-infrared-absorbing film or panel of the present invention.

The film and the multi-layered sheet panel according to preferred embodiments of the present invention include a near-infrared-absorbing, single-layered or multi-layered film that has an absorbing layer of a near-infrared-absorbing dye dispersed in a transparent polymer resin, and a near-infrared-absorbing, multi-layered sheet panel including such a novel film, respectively.

The absorbing layer of a near-infrared-absorbing dye dispersed in a transparent polymer resin, which is in the near-infrared-absorbing panel of the preferred embodiments of the present invention, may be any of a film formed from a uniform solution of a near-infrared-absorbing dye and a polymer resin provided in a solvent through casting; a film formed by applying a uniform solution of a near-infrared-absorbing dye and a polymer resin provided in a solvent onto a transparent film of polyester, polycarbonate or the like through coating; a film formed through melt extrusion of a near-infrared-absorbing dye and a polymer resin; a film formed by polymerizing and solidifying a uniform mixture of a near-infrared-absorbing dye and a monomer; or a film formed through deposition of a near-infrared-absorbing dye along with a metal, a metal oxide or a metal salt on a transparent plastic film. Any one or more of these film layers may be included in a panel, either singly or combined with other film layers. Specifically, different films of different near-infrared-absorbing dyes are preferably formed using different methods, depending on the characteristics of the dyes, and a plurality of those films are laminated together, or the films are used singly. In this manner, the single-layered or multi-layered films may exhibit any desired color tones in the near-infrared-absorbing range and in the visible-ray range, in accordance with specific desired applications.

In ordinary hot melt extrusion methods, films are generally formed at high temperatures not lower than about 200° C. However, the film for the absorbing layer in the near-infrared-absorbing panel of the preferred embodiments of the present invention is preferably formed in a casting method or a coating method, it may be dried in a mild condition at temperatures not higher than about 150° C., at which the near-infrared-absorbing dyes used are not thermally decomposed. Therefore, in the method of at least one preferred embodiment of the present invention, even dyes having low heat resistance could be used as long as they are uniformly dispersed in ordinary organic solvent. Accordingly, the present invention is advantageous in that the number of dyes capable of being used is very large.

In the casting or coating method for forming the films of the preferred embodiments of the present invention, a transparent polymer resin is preferably used as the binder for the dyes to be in the films. The polymer resin may be any of known transparent plastics including, for example, copolyesters, polymethyl methacrylates, polycarbonates, polystyrenes, amorphous polyolefins, polyisocyanates, polyallylates, triacetylcelluloses, etc. Where it is desired to obtain thin films having a thickness of not larger than about 50 microns and having the desired near-infrared absorbing capabilities, the dyes to be used in the films are dissolved in the binder resin to have a high concentration of from about 1% to about 5% by weight (relative to the solid content of the resin), depending on their types. However, stable dye solutions having such a high concentration could not be prepared, if ordinary binder resins such as polycarbonates, acrylic resins or the like are used. Even if the dye could be forcedly dissolved in such a binder resin, the resulting solution is unfavorable because the dye is unevenly distributed therein, or is precipitated to give a solid floating near the surface of the solution, or the solution is coagulated.

For the purpose of dissolving the dyes to give dyes solutions having such a high concentration, preferred are the polyester resins described in the applicant's own JP-A Hei-06-184288, Hei-6-049186, Hei-07-149881, and Hei-08-100053. These polyester resins are preferred, as dissolving the dyes for use in preferred embodiments of the present invention to form dye solutions having a high concentration. Accordingly, in the preferred embodiments of the present invention, preferably used are the resins for the purpose of dissolving the dyes to provide dye solutions having a high concentration.

The polyester resins are copolymerized with at least about 10 mol % of an aromatic diol of any of the following general formulae (4) to (9):

(4)

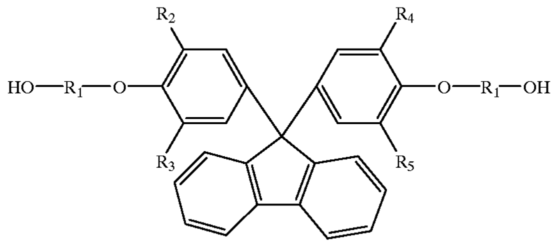

wherein $R_1$ represents an alkylene group having from 2 to 4 carbon atoms; $R_2$, $R_3$, $R_4$ and $R_5$ each represent a hydrogen atom, or an alkyl, aryl or aralkyl group having from 1 to 7 carbon atoms, and these may be the same or different:

(5)

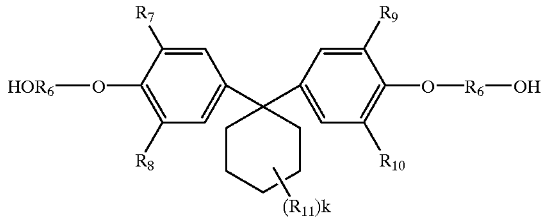

wherein $R_6$ represents an alkylene group having from 1 to 4 carbon atoms; $R_7$, $R_8$, $R_9$, $R_{10}$ and $R_{11}$ each represent a hydrogen atom, or an alkyl, aryl or aralkyl group having from 1 to 7 carbon atoms, and these may be the same or different; and k represents a natural number of from 1 to 4:

(6)

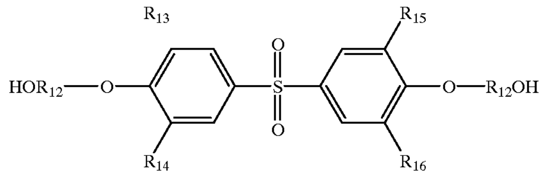

wherein $R_{12}$ represents an alkylene group having from 1 to 4 carbon atoms; $R_{13}$, $R_{14}$, $R_{15}$ and $R_{16}$ each represent a hydrogen atom, or an alkyl, aryl or aralkyl group having from 1 to 7 carbon atoms, and these may be the same or different:

(7)

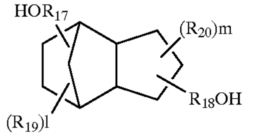

wherein $R_{17}$ and $R_{18}$ each represent an alkylene group having from 1 to 4 carbon atoms, and these may be the same or different; $R_{19}$ and $R_{20}$ each represent a hydrogen atom, or an alkyl, aryl or aralkyl group having from 1 to 7 carbon atoms, and these may be the same or different; and 1 and m each represent a natural number of from 1 to 8:

(8)

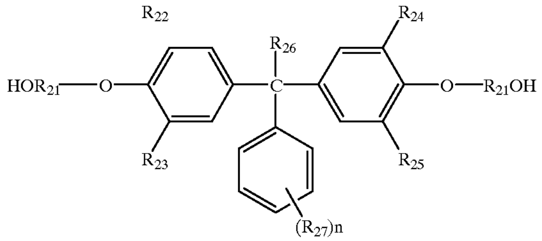

wherein $R_{21}$ represents an alkylene group having from 1 to 4 carbon atoms; $R_{22}$, $R_{23}$, $R_{24}$, $R_{25}$, $R_{26}$ and $R_{27}$ each represent a hydrogen atom, or an alkyl, aryl or aralkyl group having from 1 to 7 carbon atoms, and these may be the same or different; and n represents a natural number of from 0 to 5:

(9)

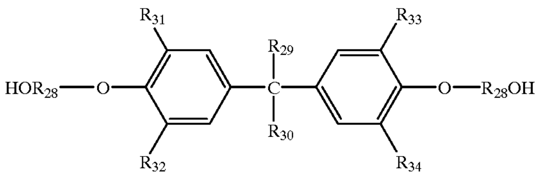

wherein $R_{28}$ represents an alkylene group having from 1 to 4 carbon atoms; $R_{29}$ and $R_{30}$ each represent an alkyl group having from 1 to 10 carbon atoms, and these may be the same or different; $R_{31}$, $R_{32}$, $R_{33}$ and $R_{34}$ each represent a hydrogen atom, or an alkyl, aryl or aralkyl group having from 1 to 7 carbon atoms, and these may be the same or different.

The compounds of formula (4) for the polyester polymers for use in preferred embodiments of the invention include, for example, 9,9-bis-[4-(2-hydroxyethoxy)phenyl]-fluorene, 9,9-bis-[4-(2-hydroxyethoxy)-3-methylphenyl]-fluorene, 9,9-bis-[4-(2-hydroxyethoxy)-3,5-dimethylphenyl]-fluorene, 9,9-bis-[4-(2-hydroxyethoxy)-3-ethylphenyl]-fluorene, 9,9-bis-[4-(2-hydroxyethoxy)-3,5-diethylphenyl]-fluorene, etc. Of these compounds, 9,9-bis[4-(2-hydroxyethoxy)phenyl]-fluorene is especially preferred for providing, as giving polyester polymers having the most balanced optical characteristics, heat resistance and shapability.

The compounds of formula (5) for the polyester polymers for use in preferred embodiments of the invention include, for example, 1,1-bis[4-(2-hydroxyethoxy)phenyl]cyclohexane, 1,1-bis[4-(2-hydroxyethoxy)-3-methylphenyl]cyclohexane, 1,1-bis[4-(2-hydroxyethoxy)-3,5-dimethylphenyl]cyclohexane, 1,1-bis[4-(2-hydroxyethoxy)-3-ethylphenyl]cyclohexane, 1,1-bis[4-(2-hydroxyethoxy)-3,5-diethylphenyl]cyclohexane, 1,1-bis[4-(2-hydroxyethoxy)-3-propylphenyl]cyclohexane, 1,1-bis[4-(2-hydroxyethoxy)-3,5-ibenzylphenyl]cyclohexane, etc.; and their derivatives in which from 1 to 4 hydrogens of the cyclohexane group are substituted with any of alkyl, aryl and aralkyl groups having from 1 to 7 carbon atoms. Of these compounds, 1,1-bis[4-(2-hydroxyethoxy)phenyl]cyclohexane is most preferred.

The compounds of formula (6) for the polyester polymers for use in preferred embodiments of the invention include, for example, bis-[4-(2-hydroxyethoxy)phenyl]-sulfone, bis-[4-(2-hydroxyethoxy)-3-methylphenyl]-sulfone, bis-[4-(2-hydroxyethoxy)-3,5-dimethylphenyl]-sulfone, bis-[4-(2-hydroxyethoxy)-3-ethylphenyl]-sulfone, bis-[4-(2-hydroxyethoxy)-3,5-diethylphenyl]-sulfone, bis-[4-(2-hydroxyethoxy)-3-propylphenyl]-sulfone, bis-[4-(2-hydroxyethoxy)-3,5-dipropylphenyl]-sulfone, bis-[4-(2-hydroxyethoxy)-3-isopropylphenyl]-sulfone, etc.

The compounds of formula (7) for the polyester polymers for use in preferred embodiments of the invention include, for example, tricyclodecanedimethylol, tricyclodecanediethylol, tricyclodecanedipropylol, tricyclodecanedibutylol, dimethyltricyclodecanedimethylol, diethyltricyclodecanedimethylol, diphenyltricyclodecanedimethylol, dibenzyltricyclodecanedimethylol, tetramethyltricyclodecanedimethylol, hexamethyltricyclodecanedimethylol, octamethyltricyclodecanedimethylol, etc. Of these compounds, tricyclodecanedimethylol is especially preferred.

The dihydroxy compounds of formula (8) for the polyester polymers for use in preferred embodiments of the invention include, for example, 1,1-bis[4-(2-hydroxyethoxy)phenyl]-1-phenylethane, 1,1-bis[4-(2-hydroxyethoxy)-3-methylphenyl]-1-phenylethane, 1,1-bis[4-(2-hydroxyethoxy)-3,5-dimethylphenyl]-1-phenylethane, 1,1-bis[4-(2-hydroxyethoxy)-3-ethylphenyl]-1-phenylethane, 1,1-bis[4-(2-hydroxyethoxy)-3,5-diethylphenyl]-1-phenylethane, 1,1-bis[4-(2-hydroxyethoxy)-3-propylphenyl]-1-phenylethane, 1,1-bis[4-(2-hydroxyethoxy)-3,5-dipropylphenyl]-1-phenylethane, etc.; and their derivatives in which the center carbon atom is substituted by any of alkyl, aryl and aralkyl groups having from 1 to 7 carbon atoms, and from 1 to 4 hydrogen atoms of the phenyl group of the side chain are substituted with any of alkyl, aryl and aralkyl groups having from 1 to 7 carbon atoms. Of these compounds, 1,1-bis[4-(2-hydroxyethoxy)phenyl]-1-phenylethane is especially preferred.

The compounds of formula (9) for the polyester polymers for use in preferred embodiments of the invention include, for example, 2,2-bis[4-(2-hydroxyethoxy)phenyl]propane, 2,2-bis[4-(2-hydroxyethoxy)phenyl]butane, 2,2-bis[4-(2-hydroxyethoxy)phenyl]-pentane, 2,2-bis[4-(2-hydroxyethoxy)phenyl]-3-methylbutane, 2,2-bis[4-(2-hydroxyethoxy)phenyl]hexane, 2,2-bis[4-(2-hydroxyethoxy)phenyl]-3-methylpentane, 2,2-bis[4-(2-hydroxyethoxy)phenyl]-3,3-dimethylbutane, 2,2-bis[4-(2-hydroxyethoxy)phenyl]heptane, 2,2-bis[4-(2-hydroxyethoxy)phenyl]-3-methylhexane, 2,2-bis[4-(2-hydroxyethoxy)phenyl]-4-methylhexane, 2,2-bis[4-(2-hydroxyethoxy)phenyl]-5-methylhexane, 2,2-bis[4-(2-hydroxyethoxy)phenyl]-3,3-dimethylpentane, 2,2-bis[4-(2-hydroxyethoxy)phenyl]-3,4-dimethylpentane, 2,2-bis[4-(2- hydroxyethoxy)phenyl]-4,4-dimethylpentane, 2,2-bis[4-(2-hydroxyethoxy)phenyl]-3-ethylpentane, etc. Of those, especially preferred is 2,2-bis[4-(2-hydroxyethoxy)phenyl]-4-methylpentane, since the size of its branched side chain is sufficiently large and since the solubility in organic solvents of the polymers comprising it is high. In addition, the comonomer does not interfere with the heat resistance of the polymers comprising it. Also preferred is 2,2-bis[4-(2-hydroxyethoxy)phenyl]propane, because of its excellent heat resistance and mechanical strength. In addition, the comonomer does not interfere with the solubility in organic solvents of the polymers comprising it.

The diol compounds noted above may be provided either singly or in various combinations.

Any dicarboxylic acids that are capable of producing ordinary polyester resins may be used for producing the polyester polymers for use in preferred embodiments of the invention. The dicarboxylic acids usable herein include, for example, aromatic dicarboxylic acids such as terephthalic acid, isophthalic acid, 2,6-naphthalenedicarboxylic acid, 1,8-naphthalenedicarboxylic acid, 1,4-naphthalenedicarboxylic acid, 1,2-naphthalenedicarboxylic acid, 1,3-naphthalenedicarboxylic acid, 1,5-naphthalenedicarboxylic acid, 1,6-naphthalenedicarboxylic acid, 1,7-naphthalenedicarboxylic acid, 2,3-naphthalenedicarboxylic acid, 2,7-naphthalenedicarboxylic acid, 2,2'-biphenyldicarboxylic acid, 3,3'-biphenyldicarboxylic acid, 4,4'-biphenyldicarboxylic acid, etc.; aliphatic dicarboxylic acids such as malonic acid, succinic acid, glutaric acid, adipic acid, pimelic acid, suberic acid, azelaic acid, methylmalonic acid, ethylmalonic acid, methylsuccinic acid, 2,2-dimethylsuccinic acid, 2,3-dimethylsuccinic acid, 3-methylglutaric acid, 3,3-dimethylglutaric acid, etc.; alicyclic dicarboxylic acids such as 1,4-cyclohexanedicarboxylic acid, 2,5-dimethyl-1,4-cyclohexanedicarboxylic acid, 2,3,5,6-tetramethyl-1,4-cyclohexanedicarboxylic acid, etc. For the polymers that are required to have high heat resistance, especially preferred is 2,6-naphthalenedicarboxylic acid; and for those that are required to have good shapability, preferred is terephthalic acid. The dicarboxylic acids noted above can be used herein either singly or in various combinations.

The polyester polymers for use in preferred embodiments of the present invention can be produced by any known method of, for example, melt polymerization such as interesterification or direct polymerization, or of solution polycondensation, interfacial polymerization or the like. For the production, the reaction conditions including those for polymerization catalysts to be used may be any ordinary ones, for which any ordinary methods are usable.

Where the polyester polymers for use in preferred embodiments of the present invention are produced through melt polymerization for interesterification, at least one or more compounds of the group of formulae (4) to (9) are used as comonomers, in which, preferably, the total amount of the dihydroxy compounds used is from about 10 mol % to about 95 mol % of the diol component used. Where the total amount of the dihydroxy compounds is not smaller than about 10 mol %, the solubility in organic solvents of the polymers produced could be high. Where the total amount of dihydroxy compounds is not larger than about 95 mol %, the melt polymerization is easy and the molecular weight of the polyester polymers to be produced can be accurately controlled to fall within a desired range. However, even if the total amount of the dihydroxy compounds used is larger than about 95 mol %, the monomers could well be polymerized through solution polymerization or interfacial polymerization within a shortened period of time.

As the solvent for dissolving the resin and the dye in preferred embodiments of the present invention, any and every organic solvent of which the boiling point is acceptable in practical use, for example, a boiling point not higher than about 150° C., is capable of being used. Popular solvents usable in preferred embodiments of the present invention include, for example, aliphatic halides such as chloroform, methylene chloride, dichloromethane, dichloroethane, etc.; and non-halogen organic solvents such as toluene, xylene, hexane, methyl ethyl ketone, acetone, cyclohexane, etc.

For dissolving the resin and the dye in preferred embodiments of the present invention, any ordinary stirrers and kneaders may be used. Where high-concentration solutions are prepared, butterfly mixers or planetary mixers may be used, which, however, are not whatsoever limitative.

Where the film of preferred embodiments of the present invention is produced from the solution having been prepared in the manner noted above, a casting or coating method is preferably used. In the casting method, the solution is cast onto a glass sheet or a mirror-finished metal sheet, then spread on the surface of the sheet with a rod having grooves at regular intervals thereon, and then dried, and thereafter the film formed on the sheet is peeled off in any desired manner. Thus, the intended finished film is produced. The method may be automatically machined to obtain the film, for example, by using an ordinary casting machine.

In the coating method, in general, a film or panel is coated with the solution having been prepared in the manner noted above, which is then dried to form a film layer thereon. For example, where a transparent or other functional film is coated with the solution, any ordinary coating machine is capable of being used. Using the machine, the film to be coated is moved at a speed of from a few meters/min to tens meters/min, while the solution is extruded through a T-die onto the moving film, and the thus-coated film is dried in the next drying zone where the solvent is removed, and thereafter the thus-dried film is wound up. In the machine, the series of this coating process is completed automatically.

The absorbing layer to be in the near-infrared-absorbing panel of preferred embodiments of the present invention may be formed through melt extrusion, which has the advantage of easiness and inexpensiveness in forming the layer. In this case, in general, the resin and the dye are fed into a single-screw or double-screw kneader via a feeder, melted and kneaded therein at a predetermined temperature, generally at around 300° C., and then extruded out through a T-die to provide a film. The present invention is not limited to the general melt extrusion.

As the absorbing layer to be included in the near-infrared-absorbing panel of preferred embodiments of the present invention, a film formed through polymerization and solidification is also capable of being used. As monomers in this case, usable are any known vinyl compounds such as styrene, butadiene, isoprene, methyl acrylate, etc. The dye may be previously kneaded with the monomers along with an initiator to provide a uniform liquid mixture. The dye-containing monomer mixture is cast into a frame made of sheet glass or the like, and is heated or is exposed to ultraviolet rays, whereby the monomers are polymerized.

Accordingly, for example, if dyes having poor heat resistance are used in forming the absorbing layer to be within the near-infrared-absorbing panel of preferred embodiments of the present invention, the film of the layer may be formed according to a casting method. If dyes having poor dispersibility are used, the film of the layer may be formed according to the method of polymerization followed by solidification. If any other dyes are used, the film of the layer may be formed according to the melt extrusion method. A plurality of the films thus produced may be laminated to form the panel of preferred embodiments of the present invention, in which, therefore, any desired dyes can be used for forming the individual films with no limitation. The dye density of each film layer can be separately controlled, and the color tone of the panel constituting the plural film layers may be any desired one.

The especially important characteristics of near-infrared-absorbing panels are the absorbability for near-infrared rays, and more specifically, those falling within a wavelength range of from about 850 nm to about 1200 nm, the transmittance for visible rays, and more specifically, those falling within a wavelength range of from about 400 nm to about 800 nm, and the color tone.

Of those characteristics, the near-infrared absorbability is the most important. In some uses, however, the other two characteristics are extremely important. For example, for near-infrared-absorbing panels which are for absorbing near-infrared rays from image output devices, thereby preventing the malfunction of remote controllers that operate in a near-infrared range, not only the transmittance within a visible ray range but also the color tone is extremely important especially when they are used for color image output devices. Specifically, the color difference in full color must be minimized as much as possible in the panels. In addition, in this example, the panel must have gray or brown color tone. In that case, plural dyes must be delicately combined to produce the intended color tone of the panels.

For producing near-infrared-absorbing panels according to conventional techniques, a method of kneading a transparent polymer resin and a near-infrared absorbing dye followed by extruding the resulting mixture into a sheet through hot melt extrusion, or a method of polymerizing monomers along with a near-infrared dye is used. In those conventional methods, however, only dyes which are not decomposed under heat could be used, and the latitude in selecting the desired dyes is narrow. In those, conventional methods therefore, it is extremely difficult to obtain panels having the desired characteristics noted above.

As opposed to panels produced according to the conventional methods, the near-infrared-absorbing panels of preferred embodiments of the present invention are advantageous in that they can use the films formed by a casting or coating method, in which even dyes having poor heat resistance can be used. Therefore, for the panels of the preferred embodiments of the present invention, the latitude in selecting the desired dyes is extremely broad.

Any and every dye having near-infrared absorbability is usable in forming the absorbing layer to be in the near-infrared-absorbing panel of preferred embodiments of the present invention. For example, the dyes usable in preferred embodiments of the present invention include polymethine dyes (cyanine dyes), phthalocyanine dyes, naphthalocyanine dyes, dithiol-metal complex dyes, naphthoquinone dyes, anthroquinone dyes, triphenylmethane dyes, aminium (or aluminium) dyes, di-immonium dyes, etc.

Of those, preferably combined are at least two or more of three different types of dyes, aromatic dithiol-metal complexes of a general formula (1):

(1)

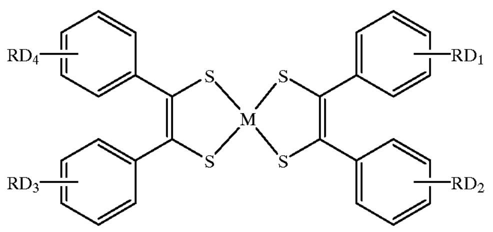

wherein $R_1$ and $R_2$ each represent an alkylene group having from 1 to 4 carbon atoms, an aryl group, an aralkyl group, a fluorine atom or a hydrogen atom; and M represents a tetradentate transition metal, aromatic di-immonium compounds of general formula (2) or (3):

(2)

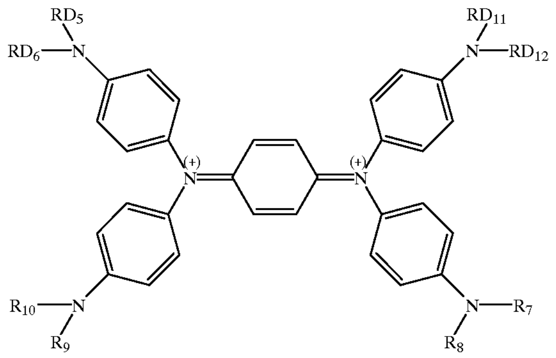

X or 2X wherein $R_1$ to $R_8$ each represent an alkyl group having from 1 to 10 carbon atoms; and X represents a monovalent anion, (3)

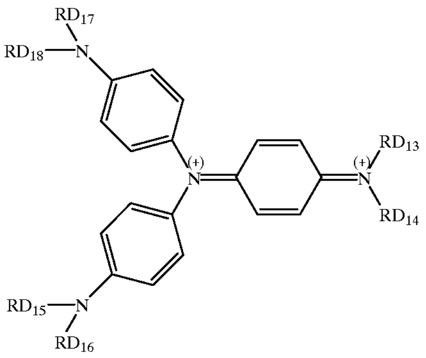

X or 2X wherein $R_1$ to $R_8$ each represent an alkyl group having from 1 to 10 carbon atoms; and X represents a monovalent anion, and phthalocyanine dyes. The combination is one novel aspect of preferred embodiments of the present invention.

The aromatic dithiol-metal complexes noted above include, for example, nickel bis-1,2-diphenyl-1,2-ethenedithiolate, and its derivatives in which one hydrogen of the two aromatic rings is substituted with a substituent of any of an alkylene group having from 1 to 4 carbon atoms, an aryl group, an aralkyl group or a fluorine atom. Specifically mentioned are compounds of the following chemical formulae (10) and (11), which, however, are not whatsoever limitative.

(10)

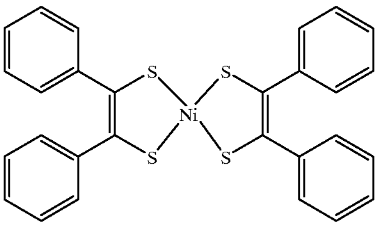

(11)

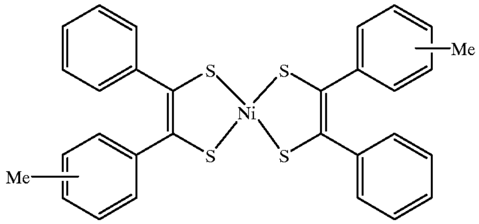

In addition, ionized derivatives of the compounds noted above, such as a compound of the following chemical formula (12), are also capable of being used in preferred embodiments of the present invention. Compounds specifically mentioned herein are not limitative. In the ionized compounds, the counter ion may be of any type and every monovalent cation except tetrabutylammonium ion used in the chemical formula (12). For example, the cations described in literature, “Development of Functional Dyes, and Market Trends” (by CMC Publishing) are acceptable.

(12)

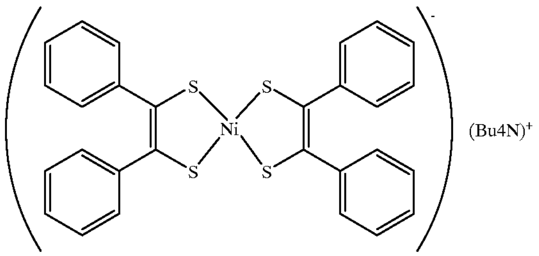

In place of the metallic nickel, any and every tetravalent transition metal is capable of being used, which includes, for example, titanium, vanadium, zirconium, chromium, molybdenum, ruthenium, osmium, cobalt, platinum, palladium, etc.

The dyes strongly absorb the rays falling within a wavelength range of from about 850 to about 900 nanometers (nm). As cutting off near-infrared rays that are applied to remote controllers, etc., the dyes are effective for preventing remote controllers from malfunctioning. When laminated with an electromagnetic radiation-absorbing layer of so-called low-radiation glass, ITO or IXO, which will be described in detail below, to produce multi-layered panels, the dye layer in the panels produced more effectively cuts off near-infrared rays.

The aromatic di-immonium compounds of formulae (2) and (3):

(2)

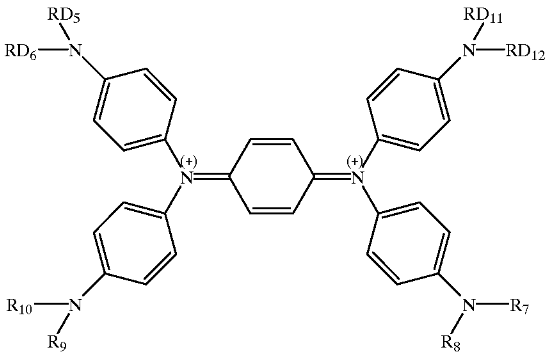

X or 2X wherein $R_1$ to $R_8$ each represent an alkyl group having from 1 to 10 carbon atoms; and X represents a monovalent anion, (3)

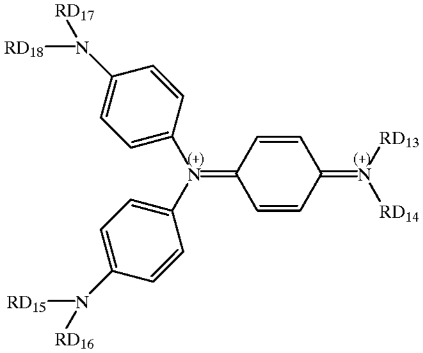

X or 2X wherein $R_1$ to $R_8$ each represent an alkyl group having from 1 to 10 carbon atoms; and X represents a monovalent anion, include, for example, compounds of the following chemical formulae (13) to (17), which, however, are not whatsoever limitative. Except the hexafluoroantimonate ion in the compounds illustrated, any other monovalent anions are capable of being used. Preferred examples of the anions include hexafluorophosphate ion, tetrafluoroborate ion, perchlorate ion, etc.

(13)

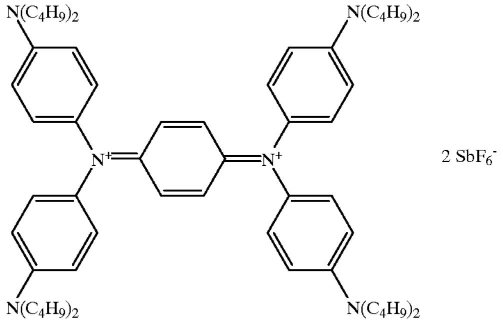

(14)

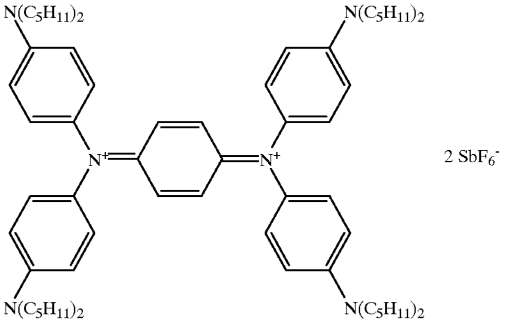

(15)

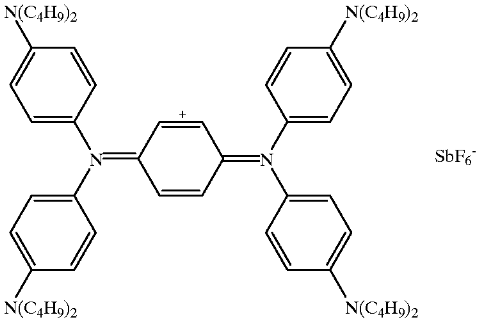

(16)

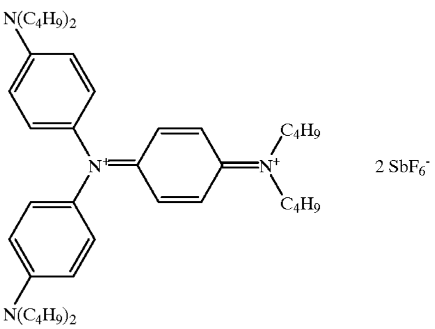

-continued (17)

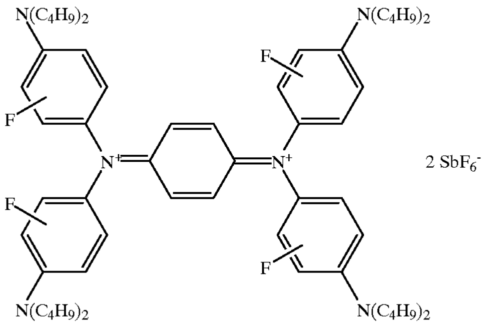

The dyes strongly absorb the rays at around 1000 nm. As cutting off not only near-infrared rays that are applied to remote controllers and the like but also rays to be applied to computer communication systems which will be widely used in future, the dyes are effective for preventing the systems from malfunctioning. When laminated with a meshed or etched electromagnetic radiation-absorbing layer, which will be described in detail hereinunder, to produce multi-layered panels, the dye layer is more effective.

The above-mentioned two types of dyes (aromatic dithiol-metal complexes, and aromatic di-immonium compounds) are especially effective. Where the dyes of those types have the ability to absorb visible rays, they may be combined with color tone-correcting dyes to modulate the color tone of the panels comprising them. As the color tone-correcting dyes for that purpose, phthalocyanine dyes are very effective. Any and every phthalocyanine dye is capable of being used herein, for example, including those described in literature, "Development of Functional Dyes, and Market Trends" (by CMC).

In general, the near-infrared-absorbing, aromatic di-immonium dyes mentioned above are unstable to heat. Therefore, if the dye layer is formed through melt extrusion or through polymerization followed by solidification, the dyes will be thermally decomposed, resulting in a poor near-infrared absorbability of the dye layer. Accordingly, when the dyes are used in the absorbing layer, it is especially desirable that the dye-containing absorbing layer is formed via a casting method.

For producing the near-infrared-absorbing panel of preferred embodiments of the present invention, previously shaped sheets or films are laminated via any suitable method. For the lamination, preferably used is a powerful, transparent polymer adhesive. The polymer adhesive of that type includes, for example, two-liquid epoxy adhesives, unsaturated polyester adhesives, urethane adhesives, phenolic resin adhesives, vinyl resin adhesives, and acrylic adhesives.

The near-infrared-absorbing panel of such a multi-layered film or sheet of preferred embodiments of the present invention may have only the near-infrared-absorbing layer noted above as the layer having a specific function.

Preferably, however, the multi-layered film or sheet of the panel additionally has any other functional layers, such as an electromagnetic radiation-absorbing layer, an antireflection layer, a shape-retaining layer, etc., in addition to the absorbing layer. The electromagnetic radiation-absorbing layer is a transparent conductive film, for which polyester films, glass sheets, acrylic sheets or polycarbonate sheets coated with a thin deposit of a metal, metal oxide, metal salt or the like are preferred. Conductive films having a lower sheet resistivity may have higher electromagnetic radiation absorbability, but on the other hand, the thickness of the metallic deposit layer to be formed on them shall be larger, resulting in the light transmittance of such thick films being lowered. The antireflection layer is provided to prevent surface reflection on the panel, while increasing the light transmittance of the panel and preventing the panel from "glaring".

In preferred embodiments of the present invention, preferably used are metal-deposited polyester films, glass sheets, acrylic sheets or polycarbonate sheets as the electromagnetic radiation-absorbing layer in the panel, which, however, are not whatsoever limitative. A film which is meshwise coated with a conductive material through screen-printing or the like may also be used as the electromagnetic radiation-absorbing layer. As the case may be, a single, metal-deposited film that acts both as the antireflection layer and as the electromagnetic radiation-absorbing layer may be used. In that case, the metal-deposited film is the outermost layer of the panel. The function of the shape-retaining layer is to retain the overall shape of the panel in which the near-infrared-absorbing layer has low mechanical strength and could hardly retain its shape. In addition, the shape-retaining layer further acts to increase the heat resistance of the entire panel and to increase the abrasion resistance of the surface of the panel. Any transparent resin or glass is preferably used as the material for the shape-retaining layer. In general, preferred are polycarbonates, polyacrylonitriles, polymethyl methacrylates, polystyrenes, and polyesters. Especially preferred are polycarbonates in view of their heat resistance, and polymethyl methacrylates in view of their transparency and abrasion resistance. Glass is also preferred for increasing the mechanical strength and the heat resistance of the panel.

As the electromagnetic radiation-shielding, transparent conductive layer noted above, a so-called heat-reflecting glass sheet prepared by coating a glass substrate with three or more layers of transparent dielectric film/thin metal film/transparent dielectric film through vapor deposition may be used. The glass sheet of that type is widely used in exteriors or windowpanes of buildings, and in windshields for cars and aircraft. As the transparent dielectrics to be used in this layer, preferred are titanium oxide, zirconia oxide, hafnium oxide, bismuth oxide, etc. As the thin metal film, preferred are gold, platinum, silver, and copper. In place of the thin metal film, also preferably used is any of titanium nitride, zirconia nitride, or hafnium nitride.

The electromagnetic radiation-shielding, transparent conductive layer may be further coated with a transparent, conductive oxide film. As the oxide for the film, preferably used are fluorine-doped tin oxide, tin-doped diindium trioxide, aluminium-doped zinc oxide, etc.

Where the metal-deposited layer is used as the electromagnetic radiation-shielding, transparent conductive layer, it is combined with a near-infrared-absorbing film suitable to it. For example, heat-reflecting glass absorbs rays having a wavelength longer than about 1200 nanometers. Therefore, the dyes in the near-infrared-absorbing film to be combined with the heat-reflecting glass sheet shall absorb rays not falling within the wavelength range of the rays to be absorbed by the heat-reflecting glass sheet. Heat-reflecting glass sheets have different absorption characteristics, depending on the materials constituting them. Therefore, by controlling the dyes to be combined and also their concentration in the near-infrared-absorbing film, the film is modulated so as to be suitable to the glass sheet to be combined therewith. For this purpose, the aromatic dithiol-metal complexes of the dyes mentioned hereinabove are used, and more preferably, the aromatic dithiol-nickel complexes, most preferably nickel bis-1,2-diphenyl-1,2-ethene-dithiolate, or its derivative in which the hydrogen of the benzene ring is substituted with a fluorine atom or a methyl group. For further modulating the color tone of the dye-containing layer, a phthalocyanine dye may be added thereto.

Where the electromagnetic radiation-shielding conductive layer has near-infrared-reflecting capabilities and where it is combined with a near-infrared-absorbing film of preferred embodiments of the present invention that contains, in a transparent polymer resin, a % by weight, relative to the resin, of a dithiol-metal complex, b % by weight of a phthalocyanine dye, c % by weight of a di-immonium dye and d % by weight of an aminium dye, the ranges within which the dyes act effectively are approximately $0.1 \leqq a \leqq 5.0$, $0.01 \leqq b \leqq 2.0$, $0.1 \leqq c \leqq 3.0$, and $0.01 \leqq d \leqq 1.0$, preferably $0.5 \leqq a \leqq 2.5$, $0.01 \leqq b \leqq 2.0$, $0.2 \leqq c \leqq 1.0$, and $0.1 \leqq d \leqq 0.5$. Specifically, the dyes to be in the absorbing layer are preferably formulated so that they satisfy the requirement of $0.81 \leqq a+b+c+d \leqq 6.0$. The resin mixture comprising the dyes noted above is sheeted into a film of the absorbing layer through casting, coating, melt extrusion or polymerization. In the polymerization method, the dyes are added to the monomers to be polymerized. If, however, the dyes are formulated under the condition of $a+b+c+d<0.81$ and the resin mixture comprising them is sheeted into a film, the resulting film has poor near-infrared absorbability though it may have a high degree of visible ray transmittance. The film, even if used in near-infrared radiation-shielding filters, is no more effective and is unfavorable. On the other hand, if the dyes are formulated under the condition of $a+b+c+d>6.0$ and the resin mixture comprising them is sheeted into a film, the resulting film has a low degree of visible ray transmittance though it may have good near-infrared absorbability. The film is useless in optical filters. Regarding these matters, one preferable embodiment is shown in Example 24 mentioned below, and one nonpreferable embodiment is in Comparative Example 1.

Where the electromagnetic radiation-shielding, transparent conductive layer is a mesh-type layer, such as that mentioned above, and where it is combined with a near-infrared-absorbing film of preferred embodiments of the present invention, the absorption of the rays falling within an intended wavelength range must be attained by the dyes only that exist in the absorbing film, since the mesh-type layer has no near-infrared absorbability. The same shall apply to the layer not having electromagnetic radiation shieldability. As the dyes for that purpose, preferred is a mixture of an aromatic di-immonium compound and an aromatic dithiol-metal complex. Like in the above, the aromatic dithiol-metal complex is preferably an aromatic dithiol-nickel complex, most preferably nickel bis-1,2-diphenyl-1,2-ethene-dithiolate, or its derivative in which the hydrogen of the benzene ring is substituted with a fluorine atom or a methyl group. In the aromatic di-immonium compound, the counter anion is preferably a hexafluoroantimonate, hexafluoroarsenate, perchlorate or tetrafluoroborate ion. If desired, a phthalocyanine dye may be added to the dye mixture for color modulation.

Where the electromagnetic radiation-shielding conductive layer does not have near-infrared-reflecting capabilities, and where it is combined with a near-infrared-absorbing of the invention that contains, in a transparent polymer resin, a % by weight, relative to the resin, of a dithiol-metal complex, b % by weight of a phthalocyanine dye, c % by weight of a di-immonium dye and d % by weight of an aminium dye, as in the above, the preferred ranges for the dyes are approximately $0.1 \leqq a \leqq 3.0$, $0.01 \leqq b \leqq 2.0$, and $0.1 \leqq c \leqq 5.0$, more preferably $0.5 \leqq a \leqq 2.0$, $0.1 \leqq b \leqq 1.0$, and $1.0 \leqq c \leqq 3.0$. Specifically, the dyes to be in the absorbing layer are preferably formulated so that they satisfy the requirement of $1.6 \leqq a+b+c \leqq 6.0$. The resin mixture comprising the dyes noted above is sheeted into a film of the absorbing layer through casting, coating, melt extrusion or polymerization. In the polymerization method, the dyes are added to the monomers to be polymerized. If, however, the dyes are formulated according to the condition of $a+b+c<1.6$ not satisfying the requirement noted above and the resin mixture comprising them is sheeted into a film, the resulting film has poor near-infrared absorbability though it may have a high degree of visible ray transmittance. The film, even if used in near-infrared radiation-shielding filters, is not more effective and is unfavorable. On the other hand, if the dyes are formulated according to the condition of $a+b+c>6.0$ and the resin mixture comprising them is sheeted into a film, the resulting film has a low degree of visible ray transmittance though it may have good near-infrared absorbability. The film is useless in optical filters. Regarding these matters, one preferable embodiment is shown in Example 25 mentioned below, and one nonpreferable embodiment is in Comparative Example 3.

Figure 1B:
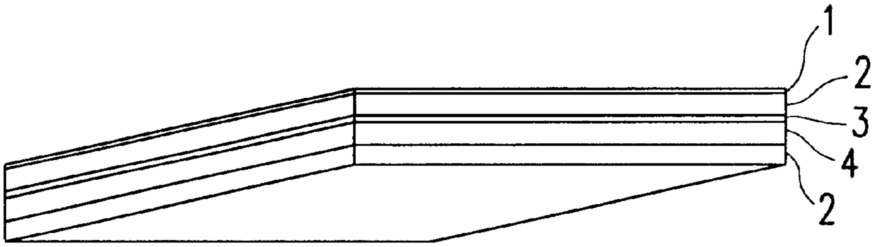
Figure 1C:
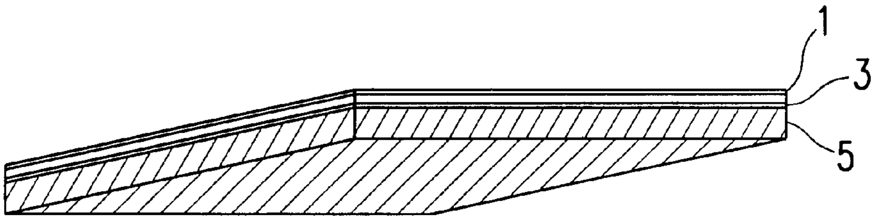

Preferred embodiments of the present invention are described more specifically with reference to FIG. 1.

In FIG. 1, 1 is an antireflection layer; 2 is a shape-retaining layer of a transparent resin such as polycarbonate, polymethyl methacrylate or the like or of glass; 3 is a transparent conductive layer that acts as an electromagnetic radiation-shielding layer and also as a near-infrared radiation-shielding layer, and this layer is formed on a polyester film through vapor deposition, or is directly deposited on a glass sheet. Layer 4 is a near-infrared-absorbing layer of a dye having poor heat resistance or a dye having poor dispersibility, and this layer is formed through coating or casting. Layer 5 is a layer having both near-infrared absorbability and shape retainability, and this layer is formed through melt extrusion or polymerization of monomers followed by solidification.

As illustrated, a plurality of layers having different properties are laminated in different manners mentioned below to form various multi-layered structures according to preferred embodiments of the invention. However, the present invention is not whatsoever limited to the illustrated preferred embodiments, but encompasses any and every combination that indispensably contains the near-infrared-absorbing layer.

FIG. 1-A illustrates one preferred embodiment of the present invention, in which the antireflection layer 1 is attached to one surface of the shape-retaining layer 2 of polycarbonate, polymethyl methacrylate, glass or the like, while the transparent conductive layer 3 and the near-infrared-absorbing layer 4 are laminated on the other surface of the layer 2 in that order. The layer 4 is formed preferably through coating or casting.

FIG. 1-B illustrates another preferred embodiment of the present invention, in which the antireflection layer 1 is attached to one surface of the shape-retaining layer 2 of polycarbonate, polymethyl methacrylate, glass or the like, while the transparent conductive layer 3 and the near-infrared-absorbing layer 4 are laminated on the other surface of the layer 2 in that order, and in which another shape-retaining 2 of polycarbonate, polymethyl methacrylate, glass or the like is laminated on the layer 4. The layer 4 is preferably formed through coating or casting.

FIG. 1-C illustrates still another preferred embodiment of the present invention, which is a laminate composed of the antireflection layer 1, the transparent conductive layer 3, and the panel layer 5 having both near-infrared absorbability and shape retainability. The layer 5 is formed through melt extrusion or polymerization of monomers followed by solidification.

The advantages and novel features of the present invention are described more specifically with reference to the following Examples.

In the Examples, the near-infrared absorbability, the visible ray transmittance and the color tone of each sample produced are measured and evaluated according to the methods mentioned below.

(1) Near-Infrared Absorbability

For each panel produced in Examples, the light transmittance for the wavelength range falling between about 900 nm and about 1200 nm was measured, using a spectrophotometer (Best-570, manufactured by Nippon Bunko KK), and the mean value, T % was obtained. From this, obtained was the near-infrared cut-off percentage (%) of each panel, which is represented by (100−T). Each panel is evaluated on the basis of the percentage thus obtained.

(2) Visible Ray Transmittance

Using the same spectrophotometer as in (1), the mean light transmittance, Tv % for the wavelength range falling between about 450 nm and about 700 nm was measured, which indicates the visible ray transmittance of each panel.

EXAMPLE 1

Starting compounds of 0.4 mols of dimethyl terephthalate (DMT), 0.88 mols of ethylene glycol (EG) and 0.28 mols of 9,9-bis(4-(2-hydroxyethoxy)phenyl)fluorene (BPEF) were polymerized through ordinary melt polymerization to produce a fluorene copolyester (DM/BPEF=3/7, by mol). The copolyester had a limiting viscosity [η] of 0.42, a molecular weight Mw of 45,000, and a glass transition point Tg of 140° C.

Nickel bis-1,2-diphenyl-1,2-ethene-dithiolate was produced according to a known method (Harry B. Gray, et al., J. Am. Chem. Soc., Vol. 88, pp. 43–50, pp. 4870–4875, 1966), and purified through recrystallization to have a purity of not lower than 99%.

The fluorene copolyester was dispersed and dissolved in methylene chloride along with 0.038% by weight, relative to the copolyester, of nickel bis-1,2-diphenyl-1,2-ethene-dithiolate, 0.005% by weight of phthalocyanine dye (EX Color 801K, manufactured by Nippon Shokubai), and 0.005% by weight of phthalocyanine dye (EX Color 802K, manufactured by Nippon Shokubai), and the resulting dye dispersion was cast to form a film having a thickness of about 150 μm.

EXAMPLE 2

Figure 2:
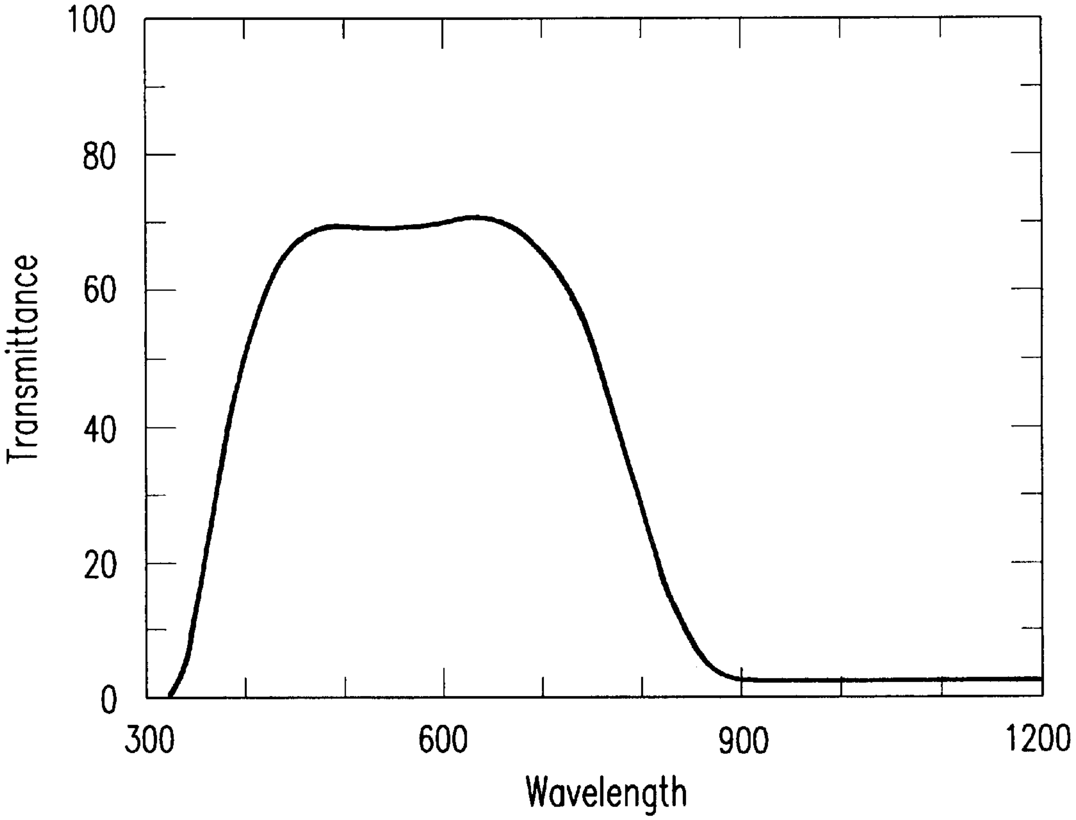
FIG. 2 shows the spectral transmittance curve of the panel of Example 2.

Using an epoxy adhesive, the film formed in Example 1 was sandwiched between polymethyl methacrylate substrates of about 1 mm thick, of which one surface was laminated with a film of about 100 μm thick that had been prepared by depositing a near-infrared-absorbing and electromagnetic radiation-absorbing layer of silver complex [ITO/(silver+platinum)/ITO—this indicates a structure of (silver+platinum) as sandwiched between ITO (indium tin oxide)] on a transparent polyester. Thus, a near-infrared-absorbing panel having the structure of FIG. 1-A was produced, and its characteristics were evaluated. The spectral transmittance curve of this panel is shown in FIG. 2. The near-infrared cut-off percentage of this panel was 97%, and the visible ray transmittance thereof was 70%. The panel was good.

EXAMPLE 3

In the same manner as in Example 1 except that triacetyl cellulose (LT-35, manufactured by Daicel Chemical) was used as the casting polymer, a near-infrared-absorbing panel having the structure of FIG. 1-A was produced, and its characteristics were evaluated. The near-infrared cut-off percentage of this panel was 97%, and the visible ray transmittance thereof was 70%. The panel was good.

EXAMPLE 4

0.005% by weight of nickel bis-1,2-diphenyl-1,2-ethene-dithiolate, 0.001% by weight of phthalocyanine dye (EX Color 801K, manufactured by Nippon Shokubai), and 0.001% by weight of phthalocyanine dye (EX Color 802K, manufactured by Nippon Shokubai) were dispersed in polymethyl methacrylate, and sheeted into a film having a thickness of about 2 mm through melt extrusion.

One surface of this film was laminated with a film (thickness: 100 μm) that had been prepared by depositing a near-infrared-absorbing and electromagnetic radiation-absorbing layer of silver complex [ITO/(silver+platinum)/ITO] on a transparent polyester. Thus, a near-infrared-absorbing panel having the structure of FIG. 1-C was produced, and its characteristics were evaluated. The near-infrared cut-off percentage of this panel was 97%, and the visible ray transmittance thereof was 65%. The panel was good.

EXAMPLE 5

0.005% by weight of nickel bis-1,2-diphenyl-1,2-ethene-dithiolate, 0.02% by weight of aminium dye of formula (16), 0.01% by weight of phthalocyanine dye (EX Color 801K, manufactured by Nippon Shokubai), and 0.01% by weight of phthalocyanine dye (EX Color 802K, manufactured by Nippon Shokubai) were dispersed in polymethyl methacrylate, and sheeted into a film having a thickness of about 2 mm through melt extrusion.

The film thus prepared herein, and a film (thickness: 100 μm) that had been prepared by depositing an electromagnetic radiation-absorbing layer of silver complex [ITO/(silver+platinum)/ITO] on a transparent polyester were laminated on a shape-retaining layer. Thus, a near-infrared-absorbing panel having the structure of FIG. 1-A was produced, and its characteristics were evaluated. The near-infrared cut-off percentage of this panel was 97%, and the visible ray transmittance thereof was 64%. The panel was good.

EXAMPLE 6

0.005% by weight of di-immonium dye of formula (13) and 0.001% by weight of phthalocyanine dye (EX Color 803K, manufactured by Nippon Shokubai) were dispersed in polymethyl methacrylate, and sheeted into a film having a thickness of about 2 mm through melt extrusion.

The film thus prepared herein, and a film (thickness: 100 μm) that had been prepared by depositing an electromagnetic radiation-shielding layer of silver complex [(gold+silver)/ITO—this indicates a structure composed of ITO and (silver+platinum)] on a transparent polyester were laminated on a shape-retaining layer. Thus, a near-infrared-absorbing panel having the structure of FIG. 1-C was produced, and its characteristics were evaluated. The near-infrared cut-off percentage of this panel was 97%, and the visible ray transmittance thereof was 65%. The panel was good.

EXAMPLE 7

The fluorene copolyester prepared in Example 1 was mixed with 0.1% by weight, relative to the copolyester, of di-immonium compound dye of formula (13), 0.05% by weight of nickel bis-1,2-diphenyl-1,2-ethene-dithiolate and 0.03% by weight of phthalocyanine dye (EX Color 803K, manufactured by Nippon Shokubai) in chloroform, and the resulting mixture was dried at room temperature and then at 70° C. to form a film having a thickness of about 150 μm.

Figure 3:
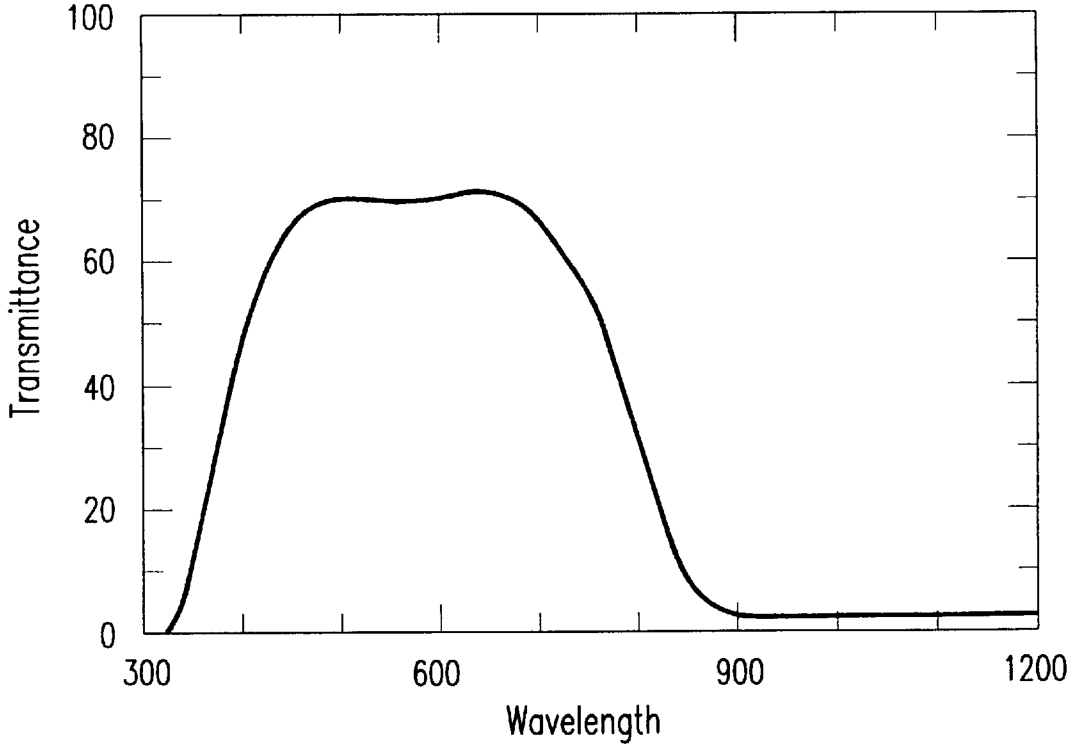
FIG. 3 shows the spectral transmittance curve of the panel of Example 7.

An electromagnetic radiation-shielding film of about 200 μm thick that had been prepared by depositing silver complex [(gold+silver)/ITO] on a polyester film, a "non-glare" and antireflection film, and the near-infrared-absorbing film prepared herein were laminated on an acrylic sheet having a thickness of about 3 mm to produce a near-infrared-absorbing panel having the structure of FIG. 1-A, and the characteristics of the panel were evaluated. The spectral transmittance curve of this panel is shown in FIG. 3. The near-infrared cut-off percentage of this panel was 95%, and the visible ray transmittance thereof was 60%. The panel was good.

EXAMPLE 8

In the same manner as in Example 7 except that 0.1% by weight, relative to the fluorene copolyester obtained in Example 1, of di-immonium compound dye of formula (13), 0.05% by weight of nickel bis-1,2-diphenyl-1,2-ethene-dithiolate and 0.05% by weight of phthalocyanine dye (EX Color 803K, manufactured by Nippon Shokubai) were used, a near-infrared-absorbing panel was produced, and its characteristics were evaluated. The near-infrared cut-off percentage of this panel was 95%, and the visible ray transmittance thereof was 62%. The panel was good.

EXAMPLE 9

In the same manner as in Example 7 except that 0.15% by weight, relative to the fluorene copolyester obtained in Example 1, of di-immonium compound dye of formula (13), 0.05% by weight of nickel bis-1,2-diphenyl-1,2-ethene-dithiolate and 0.03% by weight of phthalocyanine dye (EX Color 803K, manufactured by Nippon Shokubai) were used, a near-infrared-absorbing panel was produced, and its characteristics were evaluated. The near-infrared cut-off percentage of this panel was 97%, and the visible ray transmittance thereof was 60%. The panel was good.

EXAMPLE 10

In the same manner as in Example 7 except that 0.15% by weight, relative to the fluorene copolyester obtained in Example 1, of di-immonium compound dye of formula (13) and 0.05% by weight of phthalocyanine dye (EX Color 803K, manufactured by Nippon Shokubai) were used, a near-infrared-absorbing panel was produced, and its characteristics were evaluated. The near-infrared cut-off percentage of this panel was 97%, and the visible ray transmittance thereof was 60%. The panel was good.

EXAMPLE 11

In the same manner as in Example 7 except that triacetyl cellulose was used as the casting polymer and that 0.1% by weight, relative to triacetyl cellulose, of di-immonium compound dye of formula (13), 0.05% by weight of nickel bis-1,2-diphenyl-1,2-ethene-dithiolate and 0.03% by weight of phthalocyanine dye (EX Color 803K, manufactured by Nippon Shokubai) were used, a near-infrared-absorbing panel was produced, and its characteristics were evaluated. The near-infrared cut-off percentage of this panel was 97%, and the visible ray transmittance thereof was 63%. The panel was good.

EXAMPLE 12

In the same manner as in Example 7 except that triacetyl cellulose was used as the casting polymer and that 0.1% by weight, relative to triacetyl cellulose, of di-immonium compound dye of formula (13), 0.05% by weight of nickel bis-1,2-diphenyl-1,2-ethene-dithiolate and 0.05% by weight of phthalocyanine dye (EX Color 803K, manufactured by Nippon Shokubai) were used, a near-infrared-absorbing panel was produced, and its characteristics were evaluated. The near-infrared cut-off percentage of this panel was 97%, and the visible ray transmittance thereof was 60%. The panel was good.

EXAMPLE 13

In the same manner as in Example 7 except that triacetyl cellulose was used as the casting polymer and that 0.15% by weight, relative to triacetyl cellulose, of di-immonium compound dye of formula (13), 0.05% by weight of nickel bis-1,2-diphenyl-1,2-ethene-dithiolate and 0.03% by weight of phthalocyanine dye (EX Color 803K, manufactured by Nippon Shokubai) were used, a near-infrared-absorbing panel was produced, and its characteristics were evaluated. The near-infrared cut-off percentage of this panel was 97%, and the visible ray transmittance thereof was 63%. The panel was good.

EXAMPLE 14

In the same manner as in Example 7 except that triacetyl cellulose was used as the casting polymer and that 0.15% by weight, relative to triacetyl cellulose, of di-immonium compound dye of formula (13) and 0.05% by weight of phthalocyanine dye (EX Color 803K, manufactured by Nippon Shokubai) were used, a near-infrared-absorbing panel was produced, and its characteristics were evaluated. The near-infrared cut-off percentage of this panel was 95%, and the visible ray transmittance thereof was 60%. The panel was good.

EXAMPLE 15

In the fluorene copolyester that had been prepared in Example 1, dispersed were 0.225% by weight, relative to the copolyester, of di-immonium dye of formula (13), 0.075% by weight of nickel bis-1,2-diphenyl-1,2-ethene-dithiolate and 0.045% by weight of phthalocyanine dye (EX Color 803K, manufactured by Nippon Shokubai), and an adhesive polyester film (manufactured by Dia Foil) was coated with the resulting dispersion and dried. The resulting film had a thickness of about 50 μm.

Figure 4:
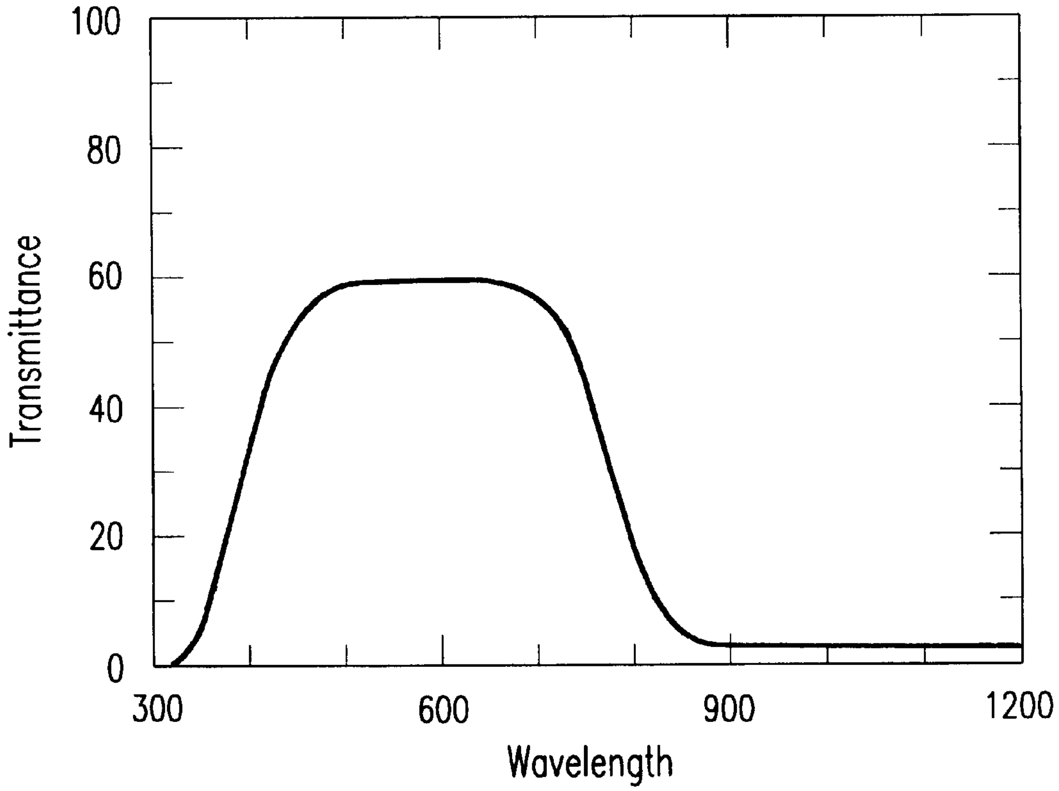
FIG. 4 shows the spectral transmittance curve of the panel of Example 15.

Apart from the film of about 50 μm thickness prepared above, further prepared were an electromagnetic radiation-shielding film (thickness: about 50 μm) having a deposit layer of silver complex [IDIXO (manufactured by Idemitsu Kosan)/silver/IDIXO—this indicates a structure of silver as sandwiched between IDIXO] formed on a polyester film, and an antireflection film, and a shape-retaining substrate of glass having a thickness of about 3 mm. Next, the electromagnetic radiation-shielding film was attached onto the both surfaces of the shape-retaining substrate in such a manner that electrodes could be mounted on the resulting laminate, and the near-infrared-absorbing film prepared herein was further attached onto one surface of the laminate. Finally, the antireflection film was attached onto the both surfaces of the laminate. Thus, a near-infrared-absorbing, electromagnetic radiation-shielding panel having the structure of FIG. 1-A was produced, and its characteristics were evaluated. The spectral transmittance curve of this panel is shown in FIG. 4. The near-infrared cut-off percentage of this panel was 97%, and the visible ray transmittance thereof was 60%. The panel was good.

EXAMPLE 16

In the same manner as in Example 15 except that a polymethyl methacrylate sheet having a thickness of about 3 mm was used as the shape-retaining substrate, a near-infrared-absorbing, electromagnetic radiation-shielding panel was produced. The near-infrared cut-off percentage of this panel was 97%, and the visible ray transmittance thereof was 60%. The panel was good.

EXAMPLE 17

In the same manner as in Example 15 except that a polycarbonate sheet having a thickness of 3 mm was used as the shape-retaining substrate, a near-infrared-absorbing, electromagnetic radiation-shielding panel was produced. The near-infrared cut-off percentage of this panel was 97%, and the visible ray transmittance thereof was 60%. The panel was good.

EXAMPLE 18

In the same manner as in Example 15 except that 0.2% by weight, relative to the fluorene copolyester obtained in Example 1, of nickel bis-1,2-diphenyl-1,2-ethene-dithiolate and 0.08% by weight of phthalocyanine dye (EX Color 803K, manufactured by Nippon Shokubai) were used, a near-infrared-absorbing, electromagnetic radiation-shielding panel was produced, and its characteristics were evaluated. The near-infrared cut-off percentage of this panel was 97%, and the visible ray transmittance thereof was 60%. The panel was good.

EXAMPLE 19

In the same manner as in Example 14 except that butyral resin (Denka Butyral 6000E, manufactured by Nippon Denka Kogyo) was used as the transparent polymer resin for the near-infrared-absorbing film and that methyl ethyl ketone was used as the solvent for dispersing the resin and the dyes, a near-infrared-absorbing, electromagnetic radiation-shielding panel was produced. The near-infrared cut-off percentage of this panel was 97%, and the visible ray transmittance thereof was 60%. The panel was good.

EXAMPLE 20

Figure 5:
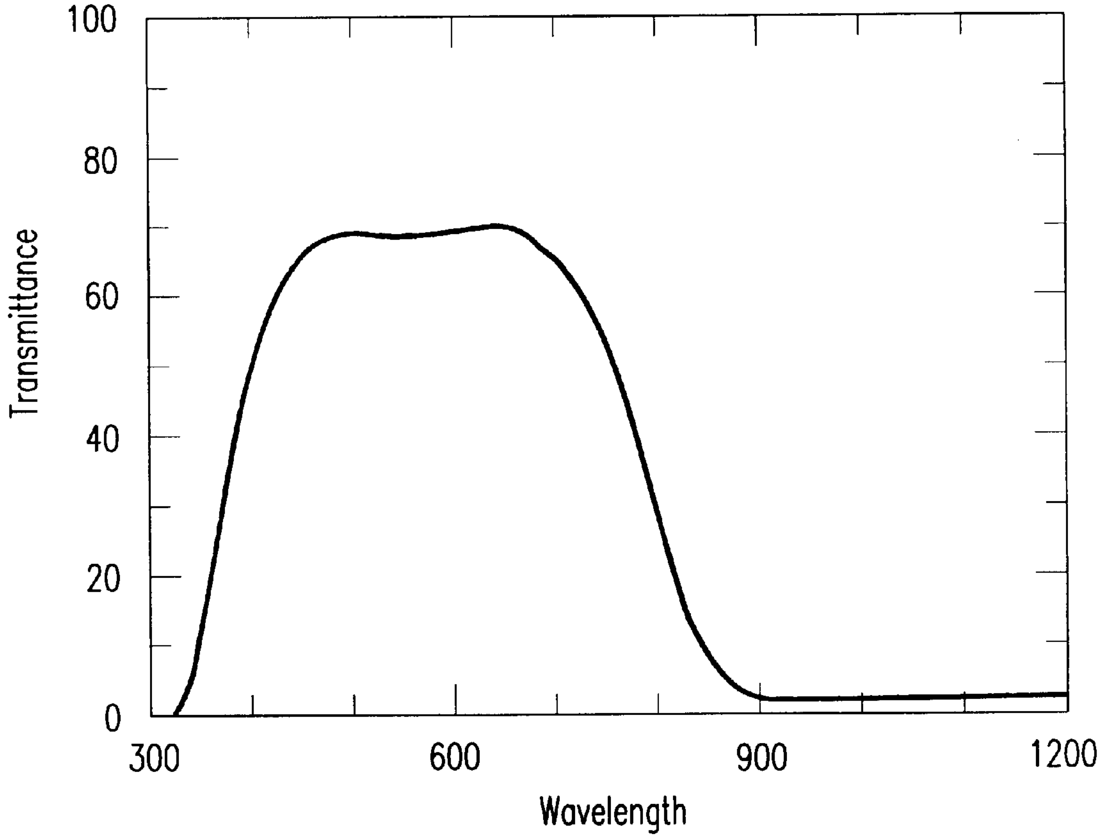
FIG. 5 shows the spectral transmittance curve of the filter of Example 20.

In the fluorene copolyester that had been prepared in Example 1, dispersed were 0.45% by weight, relative to the copolyester, of di-immonium dye of formula (13), 0.12% by weight of nickel bis-1,2-diphenyl-1,2-ethene-dithiolate and 0.06% by weight of phthalocyanine dye (EX Color 803K, manufactured by Nippon Shokubai). An adhesive polyester film substrate (A4100, manufactured by Toyobo) was coated with the resulting dispersion, and dried. Thus, a near-infrared-absorbing filter, which had a coat layer of about 50 $\mu$m thick was produced. The spectral transmittance curve of this filter is shown in FIG. 5. The near-infrared cut-off percentage of this filter was 97%, and the visible ray transmittance thereof was 60%. The filter was good.

EXAMPLE 21

In the same manner as in Example 20 except that triacetyl cellulose was used as the resin and a mixture of methylene chloride/methanol of 9/1 by weight was used as the solvent a near-infrared-absorbing filter was produced. The near-infrared cut-off percentage of this filter was 97%, and the visible ray transmittance thereof was 60%. The filter was good.

EXAMPLE 22

In the same manner as in Example 20 except that 0.40% by weight, relative to the fluorene copolyester obtained in Example 1, of di-immonium dye of formula (13), 0.10% by weight of nickel bis-1,2-diphenyl-1,2-ethene-dithiolate and 0.05% by weight of phthalocyanine dye (EX Color 803K, manufactured by Nippon Shokubai) were used, a near-infrared-absorbing filter was produced. The near-infrared cut-off percentage of this filter was 97%, and the visible ray transmittance thereof was 60%. The filter was good.

EXAMPLE 23

In the same manner as in Example 20 except that 0.50% by weight, relative to the fluorene copolyester obtained in Example 1, of di-immonium dye of formula (13), 0.15% by weight of nickel bis-1,2-diphenyl-1,2-ethene-dithiolate and 0.08% by weight of phthalocyanine dye (EX Color 803K, manufactured by Nippon Shokubai) were used, a near-infrared-absorbing filter was produced. The near-infrared cut-off percentage of this filter was 97%, and the visible ray transmittance thereof was 60%. The filter was good.

EXAMPLE 24

The fluorene copolyester that had been prepared in Example 1 was mixed with 0.6% by weight, relative to the copolyester, of nickel bis-1,2-diphenyl-1,2-ethene-dithiolate, 0.1% by weight of phthalocyanine dye (EX Color 801K, manufactured by Nippon Shokubai) and 0.1% by weight of phthalocyanine dye (EX Color 803K, manufactured by Nippon Shokubai), and dispersed in methylene chloride. An adhesive polyester film (A4100 of 0.125 mm thick, manufactured by Toyobo) was coated with the resulting dispersion, and dried at 120° C. The resulting film had a near-infrared-absorbing layer of about 0.01 mm thick formed thereon.

Figure 6:
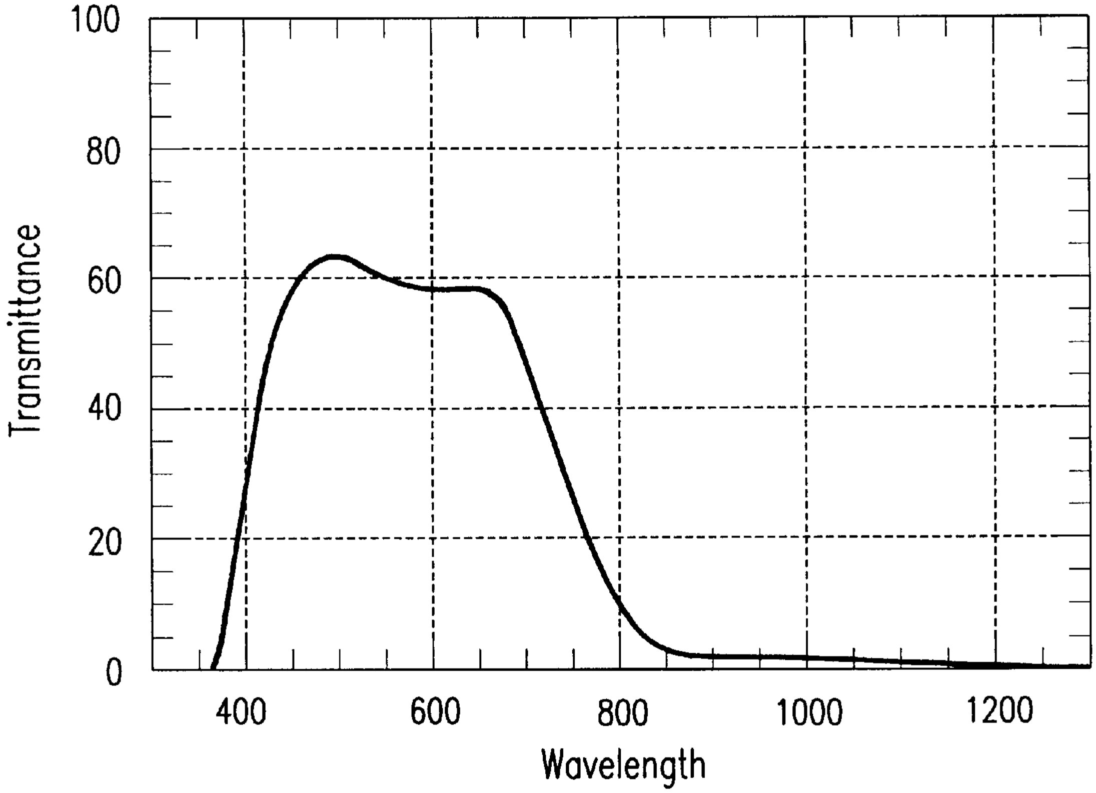
FIG. 6 shows the spectral transmittance curve of the panel of Example 24.

The thus-prepared, near-infrared-absorbing film was laminated on a transparent conductive glass sheet having a near-infrared-reflecting layer thereon. The glass sheet had a multi-layered structure of zinc oxide/silver/zinc oxide/silver/zinc oxide, in which the silver thickness per one layer was 130 Å. Thus, a near-infrared-shielding panel having the structure of FIG. 1-B was produced. The spectral transmittance curve of this panel is shown in FIG. 6. The near-infrared cut-off percentage of this panel was 97%, and the visible ray transmittance thereof was 63%. The panel was good.

EXAMPLE 25

The fluorene copolyester that had been prepared in Example 1 was mixed with 1.0% by weight, relative to the copolyester, of nickel bis-1,2-diphenyl-1,2-ethene-dithiolate, 0.2% by weight of phthalocyanine dye (EX Color 801K, manufactured by Nippon Shokubai), 0.3% by weight of phthalocyanine dye (EX Color 803K, manufactured by Nippon Shokubai) and 2.3% by weight of di-immonium dye of formula (13), and dispersed in methylene chloride. An adhesive polyester film (A4100 of 0.125 mm thick, manufactured by Toyobo) was coated with the resulting dispersion, and dried at 120° C. The resulting film had a near-infrared-absorbing layer of about 0.01 mm thick formed thereon.

Figure 7:
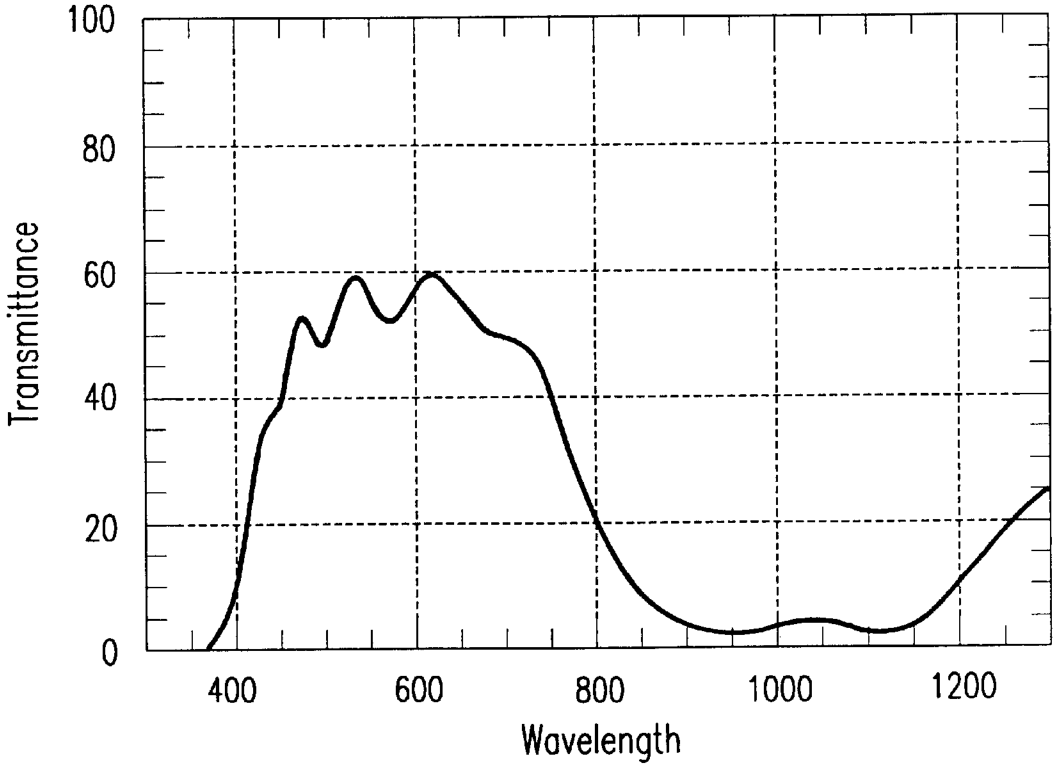
FIG. 7 shows the spectral transmittance curve of the panel of Example 25.

The thus-prepared, near-infrared-absorbing film, and a transparent conductive film having a near-infrared-reflecting layer (IDIXO, manufactured by Idemitsu Kosan) on a shape-retaining layer of an acrylic sheet having a thickness of about 3 mm. Thus, a near-infrared-shielding panel having the structure of FIG. 1-A was produced. The spectral transmittance curve of this panel is shown in FIG. 7. The near-infrared cut-off percentage of this panel was 97%, and the visible ray transmittance thereof was 60%. The panel was good.

Comparative Example 1

Figure 8:
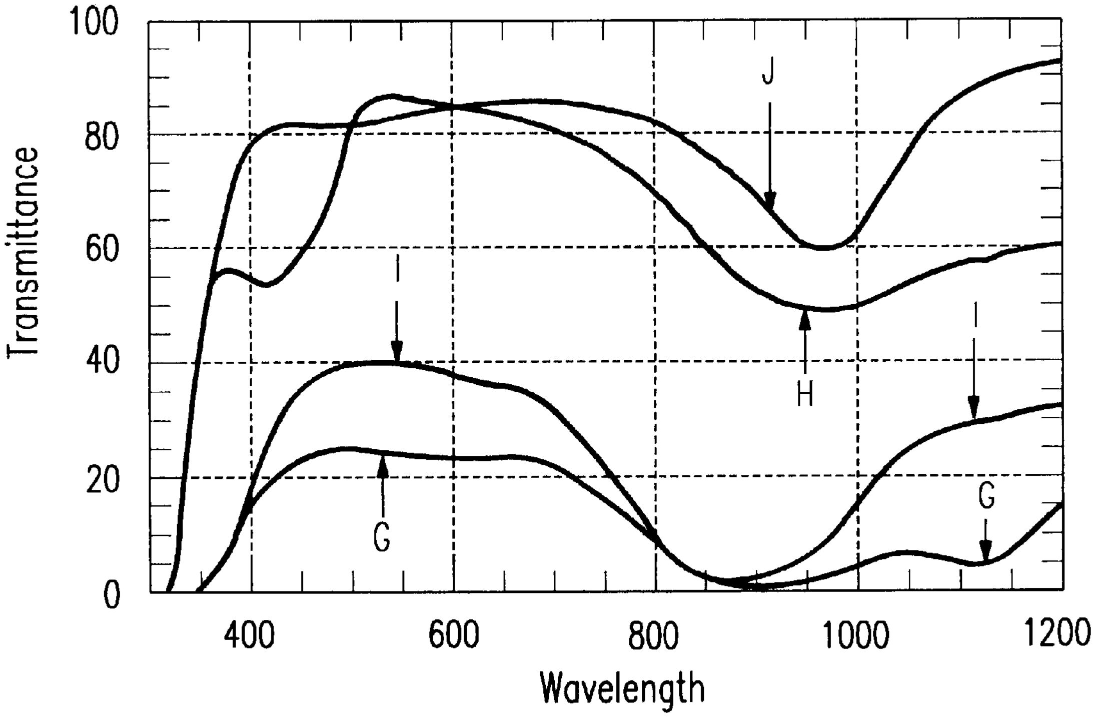
FIG. 8 shows the spectral transmittance curves of the films of Comparative Examples 1 to 4.

The fluorene copolyester that had been prepared in Example 1 was dispersed in methylene chloride along with 5.5% by weight, relative to the copolyester, of nickel bis-1,2-diphenyl-1,2-ethene-dithiolate prepared in Example 1, and 1.5% by weight of phthalocyanine dye (EX Color 803K, manufactured by Nippon Shokubai). An adhesive polyester film (A4100 of 0.125 mm thick, manufactured by Toyobo) was coated with the resulting dispersion, and dried at 120° C. The resulting film had a near-infrared-absorbing layer of about 0.01 mm thick formed thereon. The spectral transmittance curve, G, of this film is shown in FIG. 8. The film had a high near-infrared cut-off percentage of 98%, but had a low visible ray transmittance of 25%. Therefore, the film was not good.

Comparative Example 2

The fluorene copolyester that had been prepared in Example 1 was dispersed in methylene chloride along with 0.05% by weight, relative to the copolyester, of nickel bis-1,2-diphenyl-1,2-ethene-dithiolate prepared in Example 1, 0.01% by weight of phthalocyanine dye (EX Color 801K, manufactured by Nippon Shokubai) and 0.01% by weight of phthalocyanine dye (EX Color 803K, manufactured by Nippon Shokubai). An adhesive polyester film (A4100 of 0.125 mm thick, manufactured by Toyobo) was coated with the resulting dispersion, and dried at 120° C. The resulting film had a near-infrared-absorbing layer of about 0.01 mm thick formed thereon. The spectral transmittance curve, H, of this film is shown in FIG. 8. The film had a high visible ray transmittance of 85%, but had a low near-infrared cut-off percentage of 55%. Therefore, the film was not good.

Comparative Example 3

The fluorene copolyester that had been prepared in Example 1 was mixed with 2.0% by weight, relative to the copolyester, of nickel bis-1,2-diphenyl-1,2-ethene-dithiolate prepared in Example 1, 1.5% by weight of phthalocyanine dye (EX Color 803K, manufactured by Nippon Shokubai) and 4.0% by weight of di-immonium dye of formula (13), and dispersed in methylene chloride. An adhesive polyester film (A4100 of 0.125 mm thick, manufactured by Toyobo) was coated with the resulting dispersion, and dried at 120° C. The resulting film had a near-infrared-absorbing layer of about 0.01 mm thick formed thereon. The spectral transmittance curve, I, of this film is shown in FIG. 8. The film had a high near-infrared cut-off percentage of 98%, but had a low visible ray transmittance of 40%. Therefore, the film was not good.

Comparative Example 4

The fluorene copolyester that had been prepared in Example 1 was mixed with 0.05% by weight, relative to the copolyester, of nickel bis-1,2-diphenyl-1,2-ethene-dithiolate prepared in Example 1, 0.01% by weight of phthalocyanine dye (EX Color 803K, manufactured by Nippon Shokubai) and 0.05% by weight of di-immonium dye of formula (13). An adhesive polyester film (A4100 of 0.125 mm thick, manufactured by Toyobo KK) was coated with the resulting dispersion, and dried at 120° C. The resulting film had a near-infrared-absorbing layer of about 0.01 mm thick formed thereon. The spectral transmittance curve, J, of this film is shown in FIG. 8. The film had a high visible ray transmittance of 82%, but had a low near-infrared cut-off percentage of 70%. Therefore, the film was not good. The data obtained hereinabove are summarized in the following Table 1.

TABLE 1

| | Formation of Near-Infrared-Absorbing Film | Visible Ray Transmittance (%) | Near-Infrared Cut-Off Percentage (%) |
|---|---|---|---|
| Examples | | | |
| 2 | Casting | 70 | 97 |
| 3 | Casting | 70 | 97 |
| 4 | Melt Extrusion | 65 | 97 |
| 5 | Melt Extrusion | 64 | 97 |
| 6 | Melt Extrusion | 65 | 97 |
| 7 | Casting | 60 | 95 |
| 8 | Casting | 62 | 95 |
| 9 | Casting | 60 | 97 |
| 10 | Casting | 60 | 97 |
| 11 | Casting | 63 | 97 |
| 12 | Casting | 60 | 97 |
| 13 | Casting | 63 | 97 |
| 14 | Casting | 60 | 95 |
| 15 | Coating | 60 | 97 |
| 16 | Coating | 60 | 97 |
| 17 | Coating | 60 | 97 |
| 18 | Coating | 60 | 97 |
| 19 | Coating | 60 | 97 |
| 20 | Coating | 60 | 97 |
| 21 | Coating | 60 | 97 |
| 22 | Coating | 60 | 97 |
| 23 | Coating | 60 | 97 |
| 24 | Coating | 63 | 97 |
| 25 | Coating | 60 | 97 |
| Comparative Examples | | | |
| 1 | Coating | 25 | 98 |
| 2 | Coating | 85 | 55 |
| 3 | Coating | 40 | 98 |
| 4 | Coating | 82 | 70 |

As has been described in detail hereinabove, preferred embodiments of the present invention provide a single-layered or multi-layered, near-infrared-absorbing film or a multi-layered near-infrared-absorbing panel, which includes an absorbing layer of a near-infrared-absorbing dye dispersed in a transparent polymer material. The film and panel absorb near-infrared rays emitted by image output devices such as plasma displays, lighting appliances or the like so as to cut off the penetration of the rays through the film, thereby preventing remote-control infrared communication ports that use the rays falling within an infrared range for communication from malfunctioning and even preventing the appliances to be controlled by those remote-control devices from malfunctioning. In addition, they are used for detecting forged cash cards, ID cards, etc.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A multi-layered, near-infrared-absorbing panel comprising an absorbing layer of a near-infrared-absorbing dye dispersed in a transparent polymer resin further comprising at least one of an electromagnetic radiation-absorbing layer, an antireflection layer, a shape-retaining layer and an ultraviolet-absorbing layer.

2. The multi-layered, near-infrared-absorbing panel according to claim 1, wherein the absorbing layer is a transparent plastic film formed via vapor deposition of the near-infrared-absorbing dye along with a metal, a metal oxide or a metal salt.

3. The multi-layered, near-infrared-absorbing panel according to claim 1, wherein the absorbing layer is a laminate including a plurality of transparent plastic films.

4. The multi-layered, near-infrared-absorbing panel according to claim 1, further comprising a radiation-resistant glass sheet capable of reflecting heat radiations and which is laminated with the near-infrared-absorbing layer wherein a light transmittance profile is such that a visible ray transmittance is equal to or greater than 55% and a near-infrared ray transmittance is equal to or smaller than 5%.

5. The near-infrared-absorbing panel according to claim 1, wherein the near-infrared-absorbing dye and the transparent polymer resin are uniformly mixed via a casting method or a coating method.

6. The multilayered, near-infrared-absorbing film according to claim 1, wherein the dye is a mixture of at least one or more selected from the group consisting of phthalocyanine-metal complexes, aromatic dithiol-metal complexes of the following general formula (1), and aromatic di-immonium compounds of the following general formulae (2) and (3):

(1)

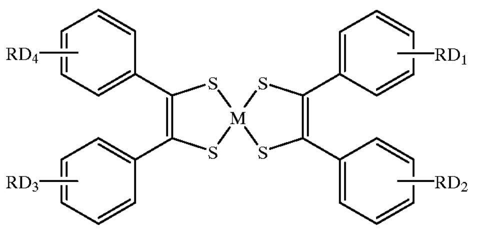

wherein $RD_1$ to $RD_4$ each represents an alkylene group having from 1 to 4 carbon atoms, an aryl group, an arylalkyl group, a fluorine atom or a hydrogen atom and M represents a transition metal having a coordination number of four;

(2)

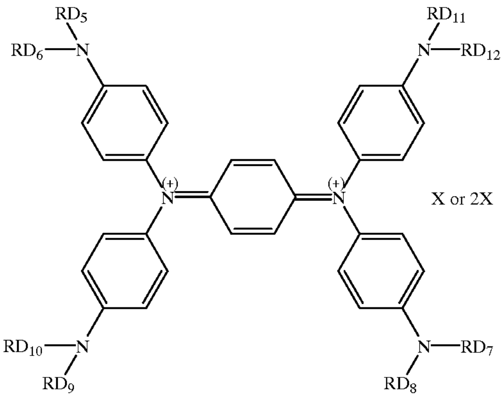

wherein $RD_5$ to $RD_{12}$ each represent an alkyl group having from 1 to 10 carbon atoms and X represents a monovalent or divalent anion, which is a counter-ion for neutralizing the ionized compound and (3)

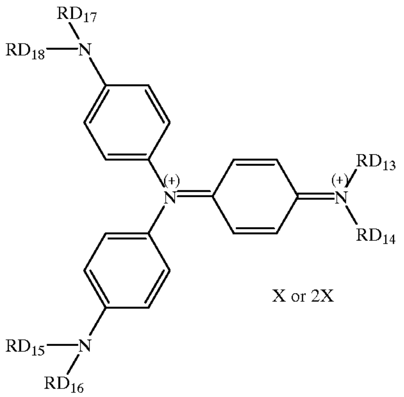

wherein $RD_{13}$ to $RD_{18}$ each represent an alkyl group having from 1 to 10 carbon atoms and X represents a monovalent or divalent anion, which is a counter-ion for neutralizing the ionized compound.

7. The near-infrared-absorbing panel according to claim 1, wherein the near-infrared-absorbing dye and the transparent resin are combined in a melt mixture formed via melt extrusion.

8. A multilayered, near-infrared-absorbing film comprising an absorbing layer of a near-infrared-absorbing dye dispersed in a transparent polymer resin further comprising at least one of an electromagnetic radiation-absorbing layer, an antireflection layer, a shape-retaining layer and an ultraviolet-absorbing layer.

9. The multilayered, near infrared-absorbing film according to claim 8, wherein the absorbing layer is a transparent plastic layer formed via vapor deposition of the near-infrared-absorbing dye along with a metal, a metal oxide or a metal salt.

10. The multilayered, near-infrared-absorbing film according to claim 8, wherein the absorbing layer is a laminate including a plurality of transparent plastic films.

11. The multilayered, near-infrared-absorbing film according to claim 8, further comprising a radiation-resistant glass sheet capable of reflecting heat radiation which is laminated with the near-infrared-absorbing film, wherein a light transmittance profile is such that a visible ray transmittance is equal to or greater than 55% and a near-infrared ray transmittance is equal to or smaller than 5%.

12. The multilayered, near infrared-absorbing film according to claim 8, wherein the near-infrared-absorbing dye and the transparent polymer resin are uniformly mixed via a casting method or a coating method.

13. The multilayered, near-infrared-absorbing film according to claim 8, wherein the dye is a mixture of at least one or more selected from the group consisting of phthalocyanine-metal complexes, aromatic dithiol-metal complexes of the following general formula (1), and aromatic di-immonium compounds of the following general formulae (2) and (3):

(1)

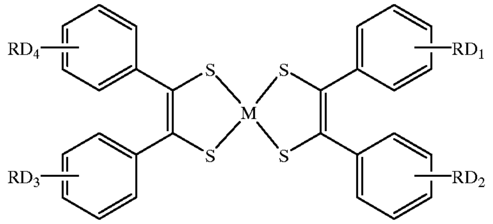

wherein $RD_1$ to $RD_4$ each represents an alkylene group having from 1 to 4 carbon atoms, an aryl group, an arylalkyl group, a fluorine atom or a hydrogen atom and M represents a transition metal having a coordination number of four;

(2)

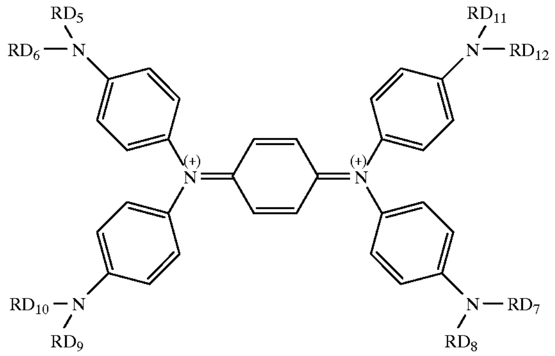

X or 2X wherein $RD_5$ to $RD_{12}$ each represent an alkyl group having from 1 to 10 carbon atoms and X represents a monovalent or divalent anion, which is a counter-ion for neutralizing the ionized compound; and (3)

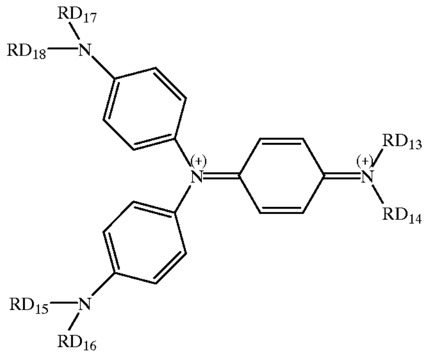

X or 2X wherein $RD_{13}$ to $RD_{18}$ each represent an alkyl group having from 1 to 10 carbon atoms and X represents a monovalent or divalent anion, which is a counter-ion for neutralizing the ionized compound.

14. The multilayered, near infrared-absorbing film according to claim 8, wherein the near-infrared-absorbing dye and the transparent resin are combined in a melt mixture formed via melt extrusion.

* * * * *